United States Patent
Abe et al.

(10) Patent No.: US 6,999,440 B2
(45) Date of Patent: *Feb. 14, 2006

(54) TDMA RADIO TERMINAL CAPABLE OF ADJUSTING TRANSMIT TIMING BY USING MEASURED DELAY TIME

(75) Inventors: Katsuaki Abe, Kawasaki (JP); Makoto Hasegawa, Tokyo (JP); Kenichi Takahashi, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 185 days.

This patent is subject to a terminal disclaimer.

(21) Appl. No.: 10/267,990

(22) Filed: Oct. 10, 2002

(65) Prior Publication Data

US 2003/0053439 A1   Mar. 20, 2003

Related U.S. Application Data

(62) Division of application No. 09/176,910, filed on Oct. 22, 1998, now Pat. No. 6,463,049.

(30) Foreign Application Priority Data

Oct. 22, 1997   (JP) .................................. 9-289413

(51) Int. Cl.
  *H04B 7/216*   (2006.01)
  *H04J 3/06*   (2006.01)

(52) U.S. Cl. ...................................... 370/335; 370/519

(58) Field of Classification Search ................ 370/335, 370/276, 347, 350, 294, 503, 518, 519; 455/82, 455/83
See application file for complete search history.

(56) References Cited

U.S. PATENT DOCUMENTS

| | | | | | |
|---|---|---|---|---|---|
| 4,346,470 | A | * | 8/1982 | Alvarez et al. | 370/324 |
| 5,363,373 | A | * | 11/1994 | Nakahara et al. | 370/314 |
| 5,379,299 | A | * | 1/1995 | Schwartz | 370/519 |
| 6,463,049 | B1 | * | 10/2002 | Abe et al. | 370/347 |

FOREIGN PATENT DOCUMENTS

| | | |
|---|---|---|
| EP | 0 690 593 A | 1/1996 |
| EP | 0 911 993 A | 4/1999 |
| WO | WO 96 13914 A | 5/1996 |

* cited by examiner

*Primary Examiner*—Duc Ho
(74) *Attorney, Agent, or Firm*—Connolly Bove Lodge & Hutz LLP

(57) ABSTRACT

A TDMA radio terminal comprises a transmitter portion and a receiver portion. A reference signal is launched in the transmitter portion while tuning the receiver portion. At the same time, an internal delay counter is started. The counter counts clock pulses till the reference signal returns through the receiver portion. Letting this pulse count be Nd, a transmission wait time is Nt−Nd. Nt is a transmit timing at the antenna. The Nd counting operation may be triggered by a power on or a signal from a controller. Method for determining the transmission wait time in the production site is also disclosed.

5 Claims, 16 Drawing Sheets

TDMA RADIO TERMINAL CAPABLE OF ADJUSTING TRANSMIT TIMING BY USING MEASURED DELAY TIME

This application is a Divisional of U.S. patent application Ser. No. 09/176,910, filed Oct. 22, 1998 now U.S. Pat. No. 6,463,049, enclosed in its entirety herewith, and claims the benefit thereof.

BACKGROUND OF THE INVENTION

1. Field of the Invention

The invention generally relates to a radio terminal for use in a cellular communication system based on a method such as TDMA (time-division multiple access) or CDMA (code-division multiple access) and more particularly to a radio terminal with a function of fine adjusting the transmit timing by compensating for the internal delay time.

2. Description of the Prior Art

In a TDMA cellular communication system for example, a reference or base station communicates with a plurality of (N) secondary or mobile stations (i.e., radio terminals) once in a time period called a frame. Each frame comprises N time slots assigned to respective radio terminals. In response to a reception of a down link signal to each of the radio terminals, the radio terminal has to synchronize a transmit signal therefrom so that the transmit signal is received by the reference station in a time slot (Ts) assigned to the radio terminal as shown in FIG. 1.

Specifically, in FIG. 1, it is assumed that if the reference station transmits a down link signal (hereinafter, referred to as a "DL signal") in a time slot assigned to a specific radio station, the DL signal takes D/2 (sec) to reach the antenna of the radio station and further takes $\alpha$ (sec) to go through the receiver portion of the radio terminal. Here, D/2 is a propagation delay time between the reference station and the radio station and $\alpha$ is an internal delay time caused by components of the receiver portion of the radio station. It is also assumed that an up link (UL) signal transmitted from the radio station takes $\beta + D/2$ (sec) to reach the reference station, where $\beta$ is an internal delay time caused by components of the transmitter portion of the radio station. A TDMA method requires each of the radio terminals served by a reference station to adjust the transmission wait time T (sec) so as to satisfy the following equation:

$$Tf = T + D + \alpha + \beta,$$

where Tf is a frame period or an interval between time slots assigned to each radio station and T is a time from the recognition of a DL signal to the beginning of a transmission operation or a transmission wait time. In other words, each radio station has to start a transmit operation T (=Tf−D−($\alpha+\beta$)) sec after recognizing a DL signal.

The present invention relates to a method and apparatus for correcting the transmission timing by using the total internal delay time ($\alpha+\beta$) in a radio terminal used in a TDMA communication system and to a radio terminal incorporating such a method and apparatus.

U.S. Pat. No. 5,363,373 issued Nov. 8, 1994 discloses a digital mobile station using presettable timeslot counter for compensating for propagation delay time. The mobile station receives a TDM signal from a cell site and detects a sync, a timeslot assignment signal and a signal indicating the propagation delay time (which corresponds to D in FIG. 1). From an assigned timeslot, a time interval from a detected frame sync to the time of transmission of a burst signal from the mobile station (Tf in FIG. 1) is determined. A pulse count corresponding to a subtraction (Tf−D) of the propagation delay time from the determined time interval is preset to a presettable counter. The counter starts counting when a frame sync is detected from the received TDM signal and generates a timing pulse when it reaches the preset pulse count to cause a burst signal to be transmitted. However, the delay time within the mobile station (i.e., $\alpha+\beta$ in FIG. 1) is not considered in deciding the transmit timing.

U.S. Pat. No. 4,346,470 issued Aug. 24, 1982 discloses a method and apparatus for acquiring transmit synchronization at a secondary station with the periodic frame reference bursts from a reference station in a TDMA network. A propagation delay factor is first measured and then a propagation delay correction factor is measured by using the propagation delay factor in satellite communication. Since the internal delay time ($\alpha+\beta$) is relatively shorter than the propagation delay time (D) in satellite communication, the internal delay time may be measured in a lower precision. The measurement of propagation delay factor or correction factor requires a transmission of burst. The synchronization scheme can not cope with changes with time in the characteristics of circuit elements constituting a radio terminal.

In some prior art radio terminals, the total internal delay time ($\alpha+\beta$) is estimated or measured in a design or development stage and stored in a memory of each product or each manufactured radio terminal. The stored total internal delay time $\alpha+\beta$ is used for calculation of the transmit timing in usual operation.

However, in such a radio communication system as requires a vary high precision of the transmit timing, the dispersion of the characteristics of circuit elements constituting each radio terminal can cause the internal delay times $\alpha$ and $\beta$ to significantly vary with each radio terminal.

It is therefore an object of the invention to provide a radio terminal with the precision of transmit timing raised by actually measuring the total internal delay time ($\alpha+\beta$) caused by the receiver and transmitter portions and fine adjusting the transmit timing with the measured total internal delay time.

SUMMARY OF THE INVENTION

According to the invention, a radio terminal capable of measuring internal delay time is provided. The radio terminal comprises: an antenna; a duplexer coupled with the antenna and having an input terminal and an output terminal for using the antenna both for transmission and reception, respectively; a transmitter portion for converting a transmission signal into a transmission band signal to feed the input terminal; a receiver portion for converting a reception band signal from the output terminal into a demodulated signal; a reference pulse signal generator; a 1-of-2 switch, activated at the latest at the same time as generating a reference pulse signal, for coupling the reference signal instead of the transmission signal with the transmitter portion; a synthesizer for causing the receiver portion to select a channel identical to the transmission band; an internal delay counter for counting clock pulses for a time period from the generation of a reference pulse signal to the reference signal returning as the demodulated signal to provide a number of counted clock pulses, Nd, corresponding to the time period (the time period being the internal delay time).

The radio terminal may further comprise a time slot timing controller for providing a transmit timing signal after counting Nt−Nd clock pulses after a detection of a relevant time slot from the demodulated signal, where Nt is a pulse count corresponding to a transmit timing at the antenna or a time period (Tf−D). This enables the radio terminal to adjust the transmit timing by using the measured internal delay time.

Instead of or in addition to the time slot timing controller, the radio terminal may comprise means for transmitting the measured internal delay time to a base station serving the radio terminal. On the basis of the received measured internal delay time, the base station can either control the transmission timing of a down link to the radio terminal or direct the radio terminal to change the up-link transmission timing.

The radio terminal may be used in a code-division multiple access communication system. In this case, the relevant time slot is assigned to a down link communication.

BRIEF DESCRIPTION OF THE DRAWING

Further objects and advantages of the present invention will be apparent from the following description of the preferred embodiments of the invention as illustrated in the accompanying drawing, in which:

FIG. 13 is a block diagram showing an arrangement of another embodiment of an internal delay counter circuit which is usable in place of the internal delay counter circuit 110 or 110a;

Throughout the drawing, the same elements when shown in more than one figure are designated by the same reference numerals.

DETAILED DESCRIPTION OF THE PREFERRED EMBODIMENTS

Embodiment I

Figure 1:
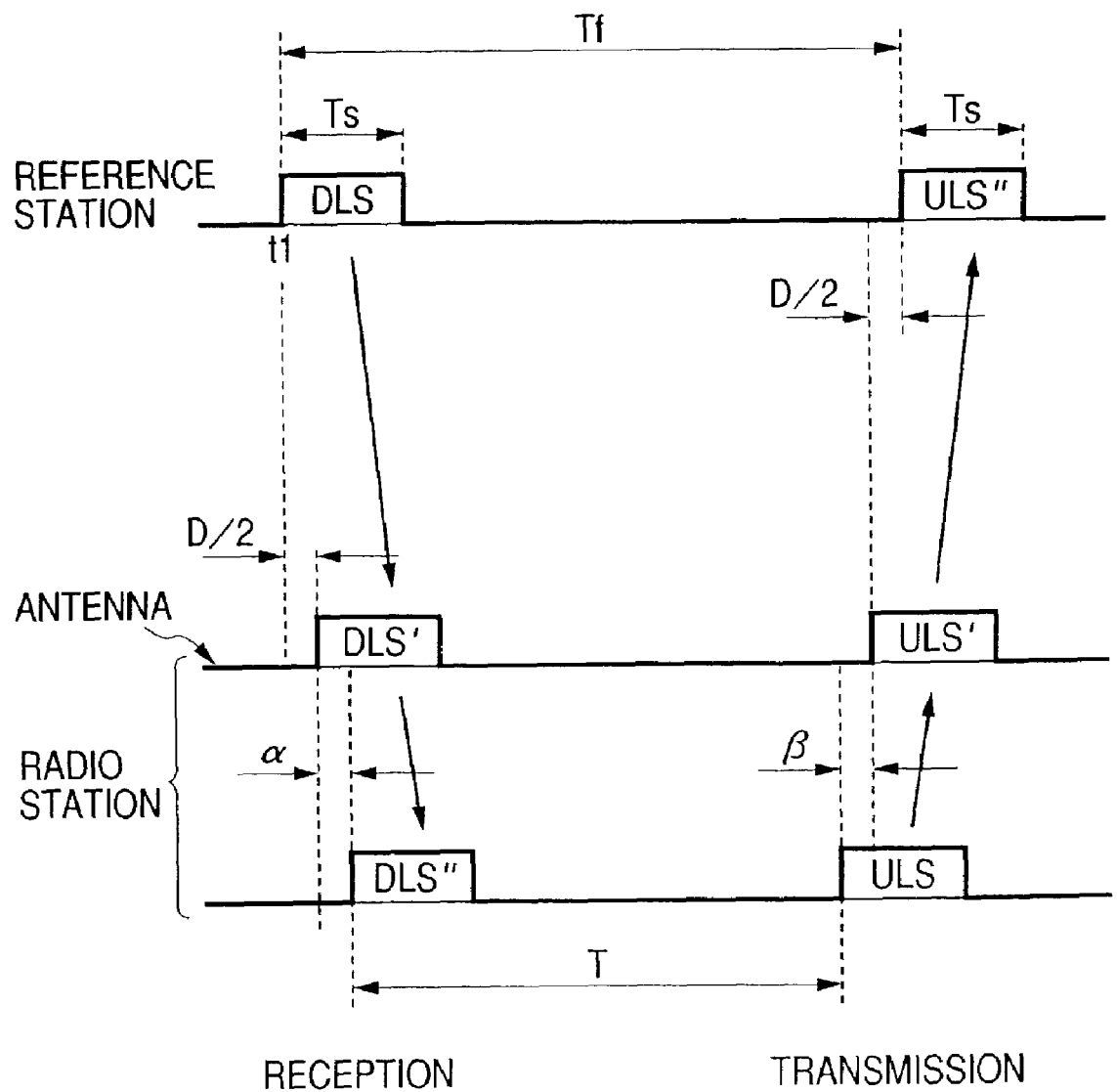
FIG. 1 is a diagram showing the way a burst is transmitted in a TDMA communication system.
Figure 2:
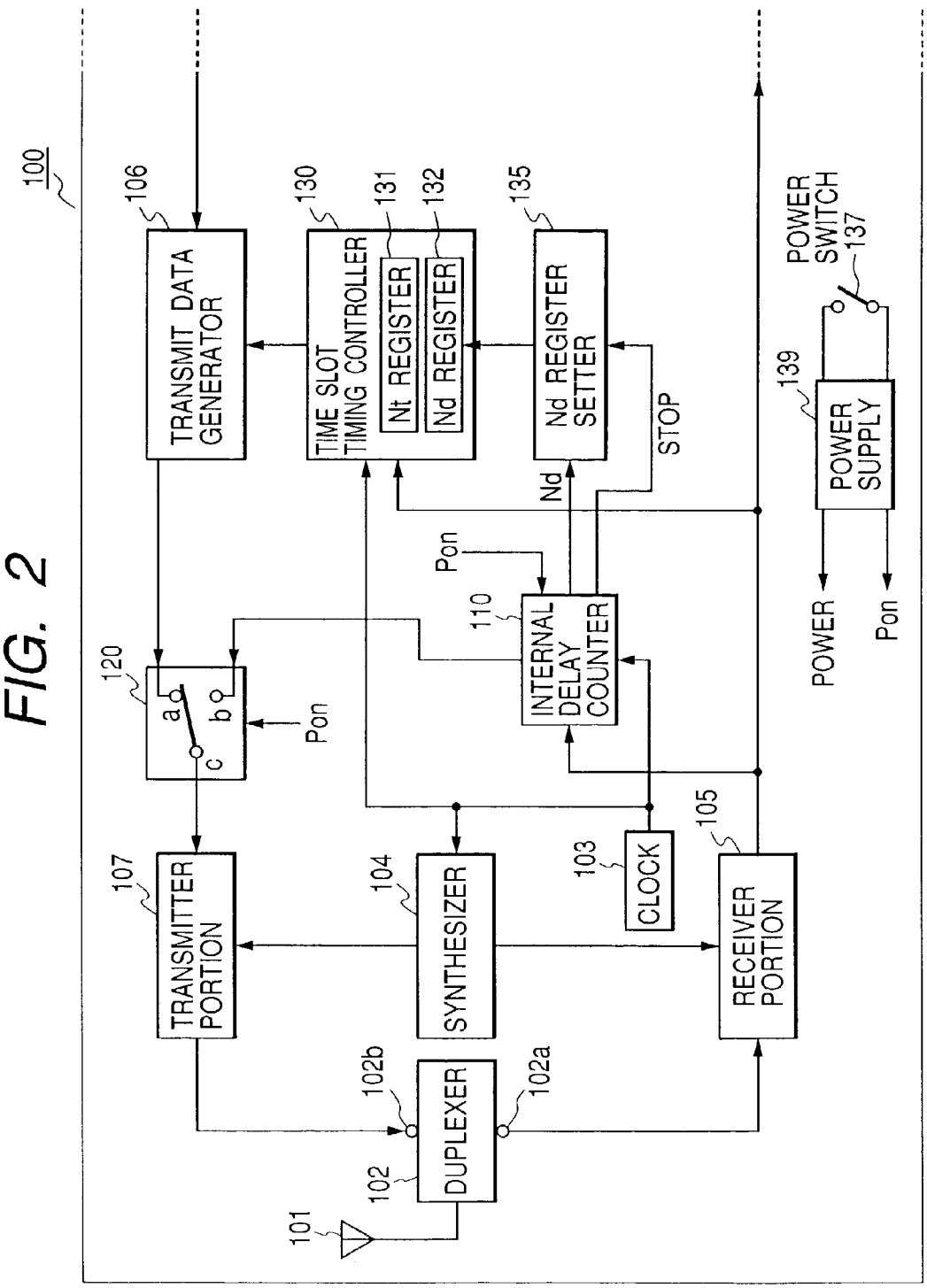
FIG. 2 is a schematic block diagram showing an arrangement of a part of a radio terminal with a transmit timing fine adjusting capability in accordance with a first illustrative embodiment of the invention.

FIG. 2 shows an arrangement of a part of a radio terminal 100 with a transmit timing fine adjusting capability in accordance with a first illustrative embodiment of the invention. The radio terminal 100 at least comprises:

an antenna 101;

a duplexer 102 for enabling the antenna 101 to be used in common for both transmission and reception;

a clock generator 103 comprising, for example, a crystal oscillator for generating a clock signal;

a synthesizer 104 comprising PLL (phase-locked loop) synthesizers for transmission and reception for generating respective local oscillation signals by using the clock signal;

a receiver portion 105 for demodulating an RF (radio frequency) signal from a reception output terminal 102a of the duplexer 102 by using the local oscillation signal for reception into a demodulated signal;

a not-shown TDMA decoder for extracting data from a time slot in the demodulated signal which slot is assigned to the radio terminal;

a transmit data generator 106 for inserting transmission data into a time slot assigned to the radio terminal in response to a trigger signal; and a transmitter portion 107 for modulating the transmission data into a modulated signal and frequency converting the modulated signal with the local oscillation signal from the synthesizer 104 for feeding the duplexer 102 through a transmission input terminal 102b thereof The radio terminal 100 further comprises:

a power supply 139 which is turned on and off by a power switch 137 and which supplies one or more voltage and a power-on (Pon) pulse signal in response to a turning on of the power switch 137;

an internal delay counter 110 for measuring the total internal delay time ($\alpha+\beta$) by transmitting a reference signal, measuring the time the reference signal takes to return through the transmitter portion 107, the duplexer 102 and the receiver portion;

a 1-of-2 selector 120 for usually supplying the transmitter portion 107 with a transmit data generator 106 output and for supplying with the reference signal from the internal delay counter 110 only for a preset short time in response to the Pon pulse signal from the power supply 139;

a time slot timing controller 130 comprising a Nt register 131 for storing a pulse count Nt corresponding to the time Tf–D, a Nd register 132 for storing a pulse count corresponding to the total internal delay time α+β, and a not-shown counter for putting out the trigger signal to the transmit data generator 106 when it counts up to Nt–Nd after receiving the demodulated signal from the receiver portion 105; and a Nd register setter 135 for transferring the pulse count Nd from the internal delay counter circuit 110 to the Nd register 132 of the time slot timing controller 135 in response to a stop signal from the internal delay counter circuit 110.

It is noted that the time slot timing controller 130 also has a function of controlling the time slot reception timing. In other words, the transmit data generator 106 and the time slot timing controller 130 constitutes a TDMA codec.

It is assumed that the duplexer 102 is guaranteed the isolation of more than several tens dB between the reception output terminal 102a and the transmission input terminal 102b thereof.

Figure 3:
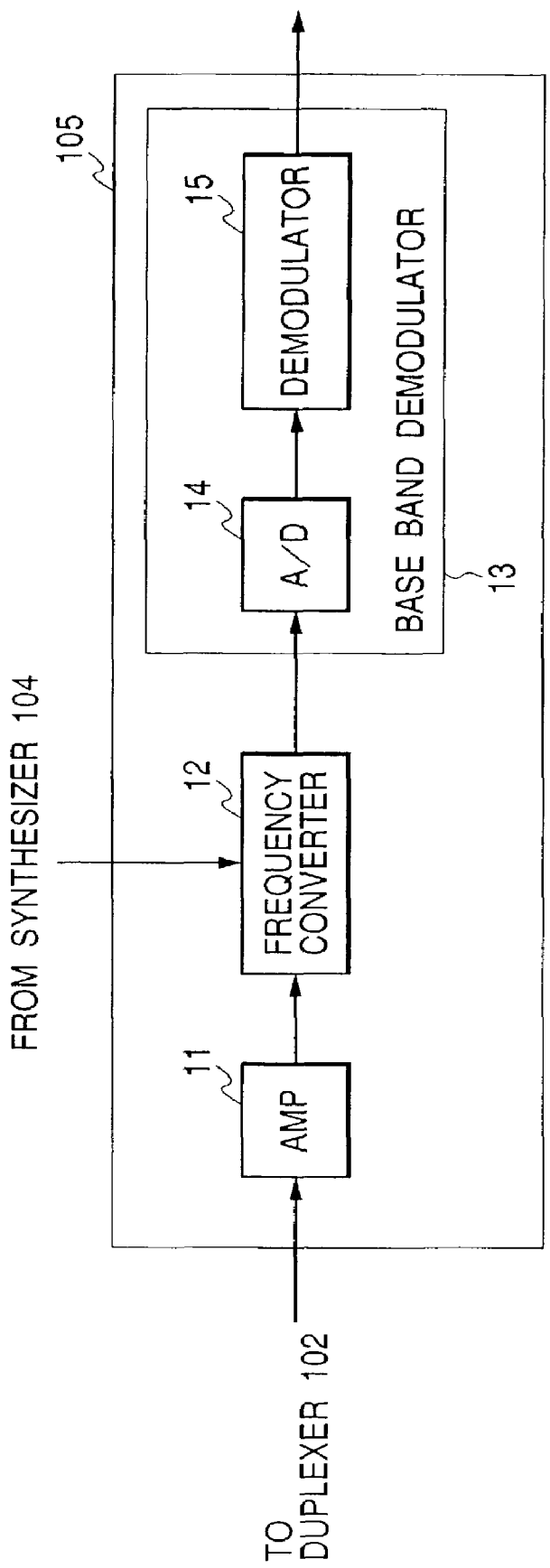
FIG. 3 is a schematic diagram showing an exemplary arrangement of the receiver portion 105 of FIG. 2.
Figure 4:
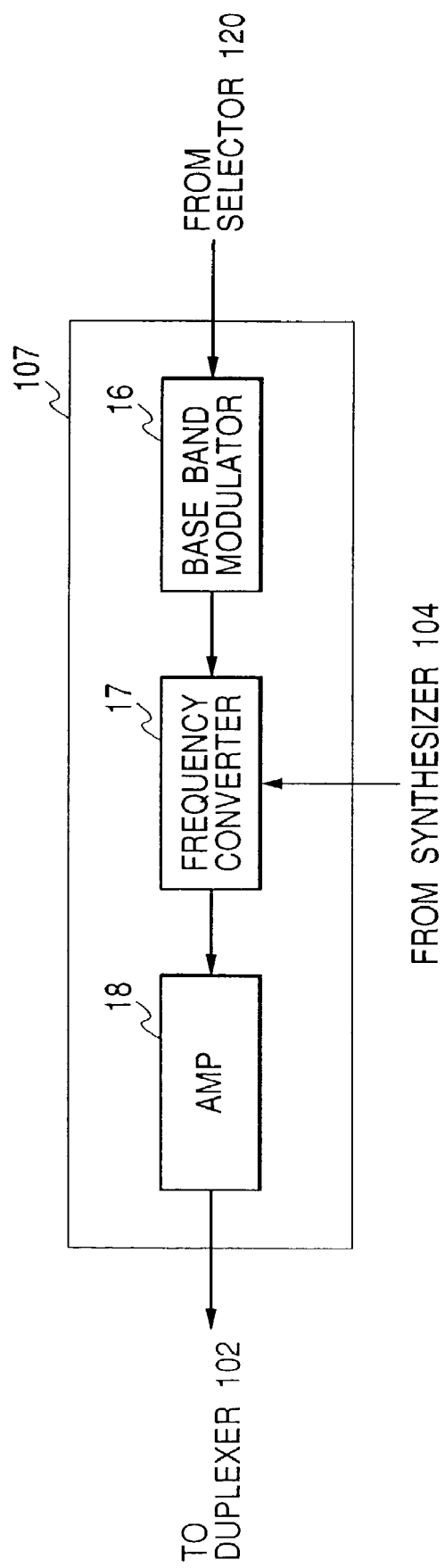
FIG. 4 is a schematic diagram showing an exemplary arrangement of the transmitter portion 107 of FIG. 2.

The receiver portion 105 comprises, for example, an amplifier (AMP) 11 for amplifying the received RF signal, a frequency converter 12 for frequency converting the amplified RF signal with the local oscillation signal from the synthesizer 104 into a base band signal, and a base band demodulator 13 for demodulating the base band signal into a demodulated signal as shown in FIG. 3. The base band demodulator 13 comprises, for example, an analog-to-digital converter 14 for converting the (analog) base band signal into a digital signal, and a digital demodulator 15 for demodulating the digital signal into the demodulated signal.

The transmitter portion 107 comprises, for example, a base band modulator 16 for orthogonally modulating with the signal from the selector 120, a frequency converter 17 for frequency converting the orthogonally modulated signal by using the local oscillation signal for transmission into an RF signal, and an amplifier (AMP) 18 for amplifying and supplying the RF signal to the duplexer transmission input terminal 102b.

Figure 5:
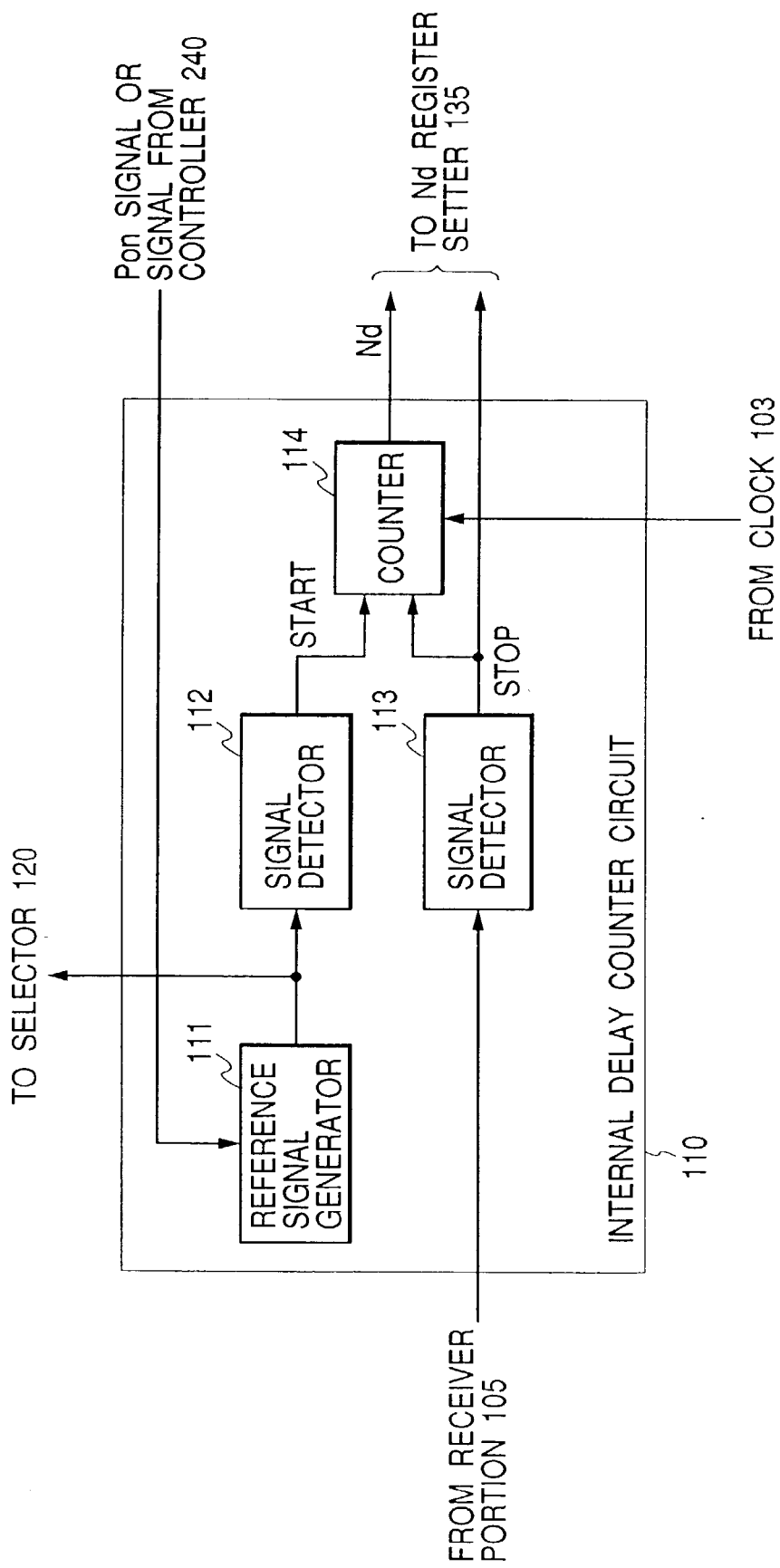
FIG. 5 is a schematic diagram showing an exemplary arrangement of the internal delay counter circuit 110 of FIG. 2.

FIG. 5 is a schematic diagram showing an exemplary arrangement of the internal delay counter circuit 110 of FIG. 2. In FIG. 5, the circuit 110 comprises:

a reference signal generator 111 for generating a predetermined reference signal in response to the Pon signal from the power supply 139;

a signal detector 112 for generating a start signal when the level of the predetermined reference signal crosses a first threshold value;

a signal detector 113 for generating a stop signal when the level of the demodulated signal from the receiver portion 105 crosses a second threshold value; and a counter 114 for starting a count operation on the clock signal from the clock 103 in response to the start signal from the signal detector 112 and stopping the count operation in response to the stop signal from the signal detector 113.

Figure 6:
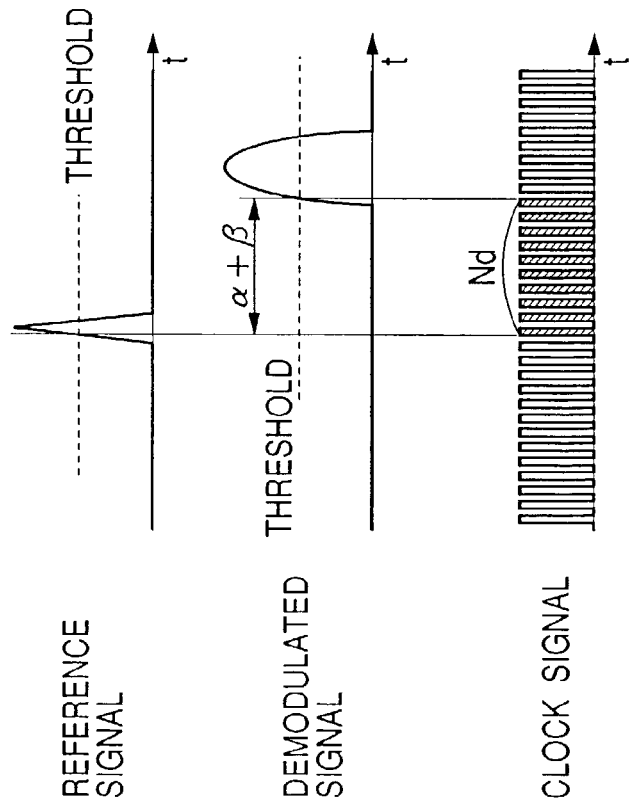

FIG. 6 is a diagram showing how the internal delay time (α+β) is measured in the internal delay counter circuit 110. It is assumed that the predetermined reference signal is a one like an impulse as shown in FIG. 6. In this specific example, the signal detectors 112 and 113 provide output signals when the input signals exceed the first and second threshold values, respectively. For example, the signal detectors 112 and 113 each comprise a comparator which makes its output signal "high" when the input signal becomes larger than the threshold value. The first threshold value for the signal detector 112 is set, for example, a half of the amplitude of the reference signal. The second threshold value for the signal detector 113 is set, for example, a half of the amplitude of the demodulated signal. The counter 114 counts the clock pulses from the clock 103 from the time of reception of a start signal from the signal detector 112 to the time of reception of a stop signal from the signal detector 113. If the number of the counted clock pulses is Nd and the time period between adjacent clock pulses is Tc, then the time between the start signal and the stop signal is equal to Nd×Tc, i.e., α+β=Nd×Tc. The counted value Nd of the counter 114 is stored in RAM 141 of the controller 140.

The operation of the radio terminal 100 is described in the following. If the power switch 137 is turned on causing the power supply 139 to assert the Pon signal, then the reference signal generator 111 responsively puts out a reference signal of an impulse shape, which is supplied to a b-terminal of the selector 120 and the signal detector 112 input.

Since the selector is so arranged as to connect the common terminal "c" with the b-terminal for a predetermined short time in response to a Pon pulse, the reference signal from the reference signal generator 111 is supplied to the transmitter portion 107 as a signal to be modulated. The reference signal is modulated and frequency converted into a transmission band signal, which is supplied to the antenna 101 via duplexer 102. Though the transmission input terminal 102b and the reception output terminal 102a are isolated by several tens dB, an attenuated transmission band signal is captured as an interference signal by a receiver portion 105 system. The interference signal includes the transmission band component and a plurality of spurious components caused by higher order distortions generated in the synthesizer 104. In response to the turning on of the radio station 100, the receiver portion 105 selects a channel identical to the transmission band to provide a demodulated signal, which has been subjected to a group delay due to various filters and accordingly appears the total internal delay time (α+β) after the generation of the reference signal.

On the other hand, the signal detector 112 has put out a start signal to the counter 114 on detecting, e.g., a rising edge of the reference signal from the reference signal generator 111. In response to the start signal, the counter 114 has started counting the clock pulses from the clock 103. If a rising edge of the demodulated signal from the receiver portion 105 is detected by the signal detector 113, the detector 113 puts out a stop signal, causing the counter 114 to stop counting. In this way, the counter 114 counts the clock pulses for the total internal delay time, i.e., α+β sec. In other words, the number of the clock pulse counted for α+β sec is Nd.

In response to the stop signal, the Nd register setter 135 transfers the count value Nd from the counter 114 to the Nd register 132 of the time slot timing controller 130. It is assumed that the controller 130 stores in the Nt register 131 a pulse count Nt equivalent to the time period from the reception, at the antenna 101, of a DL signal to the transmission, at the antenna 101, of an UL signal, i.e., the transmit timing after the reception at the antenna 101, (Tf–D). Then, the time slot timing controller 130 responsively sets the difference of the Nd register 132 contents from the Nt register 131, i.e., Nt–Nd to a not-shown register of the not-shown counter of the controller 130 as a preset value for the not-shown counter. Thus, a transmission wait time corrected with an actually measured total internal delay time is thereafter used for the transmit timing control.

In actual communication operation, if a demodulated DL signal of a time slot assigned to the radio terminal 100 is supplied to the time slot timing controller 130. The controller 130 responsively puts out a trigger signal after counting Nt–Nd, i.e., Tf–D–($\alpha$+$\beta$) sec after the reception of the demodulated DL signal.

According to the first embodiment of the invention, the transmit timing is controlled with a high precision without suffering any influence of variety in the total internal delay times of radio terminals.

Modifications

Though the above-described embodiment has used signal detectors 112 and 113 of a positive logic output type, the signal detectors each may be a combination of a negative-logic output signal detector and an inverter.

The demodulator 15 may be a demodulator of a type which also provides a demodulator output timing signal. In this case, instead of the demodulator output, the demodulator output timing signal is supplied to the signal detector 113.

In measuring the total internal delay time, the receiver portion 105 has selected a channel identical to the transmission band. However, the receiver portion 105 may select a channel of a band identical to one of the captured spurious components.

Figure 7:
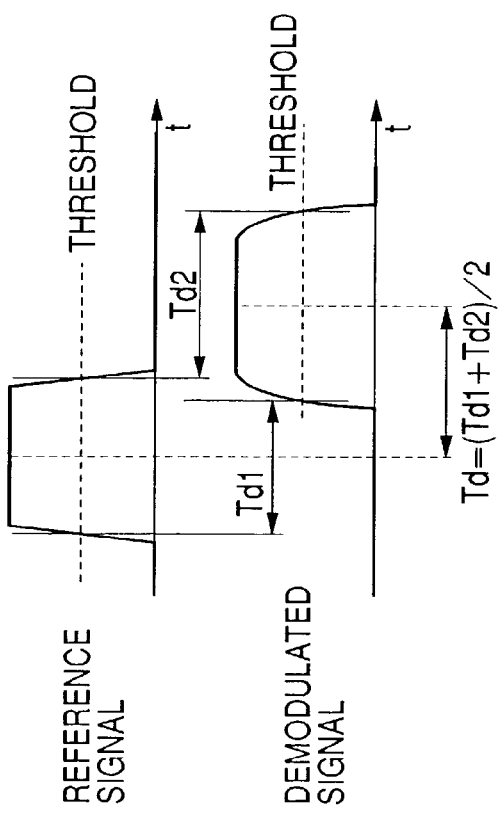
FIGS. 6 and 7 are diagrams showing how the total internal delay time is measured and two examples of reference signals.

Though the reference signal is a pulse-like signal, the reference may be a signal with a predetermined duration as shown in FIG. 7.

Though the base band demodulator 13 has performed a digital demodulation, the demodulator 13 may perform an analog demodulation.

Figure 8:
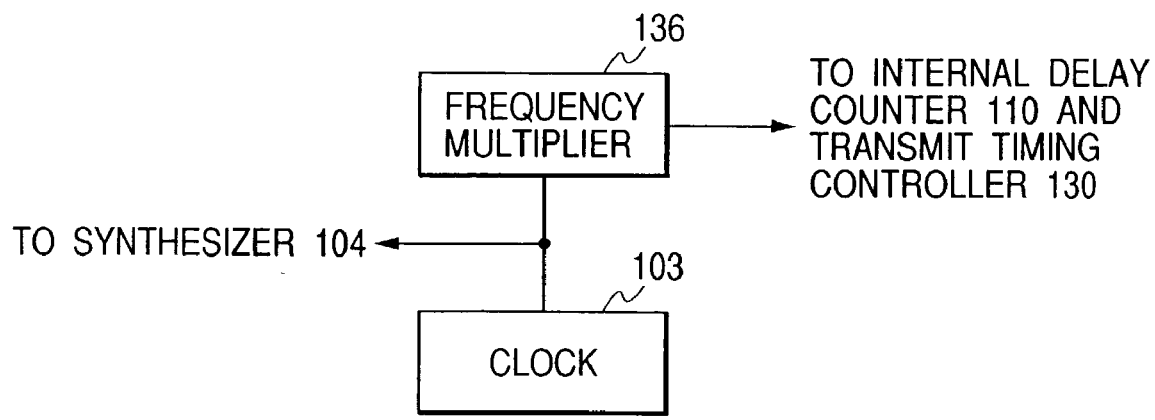
FIG. 8 is a partial block diagram showing a clock circuit of the radio terminal 100.

Instead of the clock signal, a multiplied version of the clock signal may be supplied to the internal delay counter circuit 110 and the time slot timing controller 130 by providing a frequency multiplier 136 as shown in FIG. 8. By doing this, the precision of the measurement of the total internal delay time can be raised.

Figure 9:
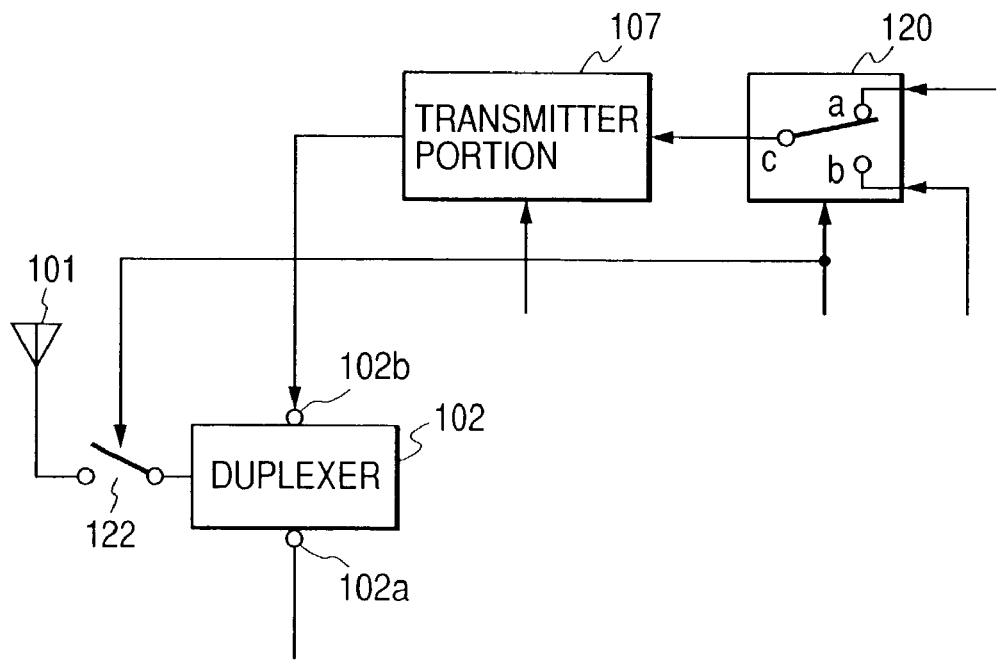
FIG. 9 is a partial block diagram showing an antenna circuit of the radio terminal 100.

The radio terminal 100 may further comprises an on/off switch 122 inserted between the antenna 101 and the duplexer 102. The switch 122 is controlled by the same control signal as supplied to the 1-of-2 switch 120 as shown in FIG. 9. The switch is so arranged as to be closed while the common terminal 120c is connected with terminal 120a and to be opened while the common terminal 120c is connected with terminal 120b. Doing this can prevent undesirable radio waves from being transmitted outside.

Embodiment II

Figure 10:
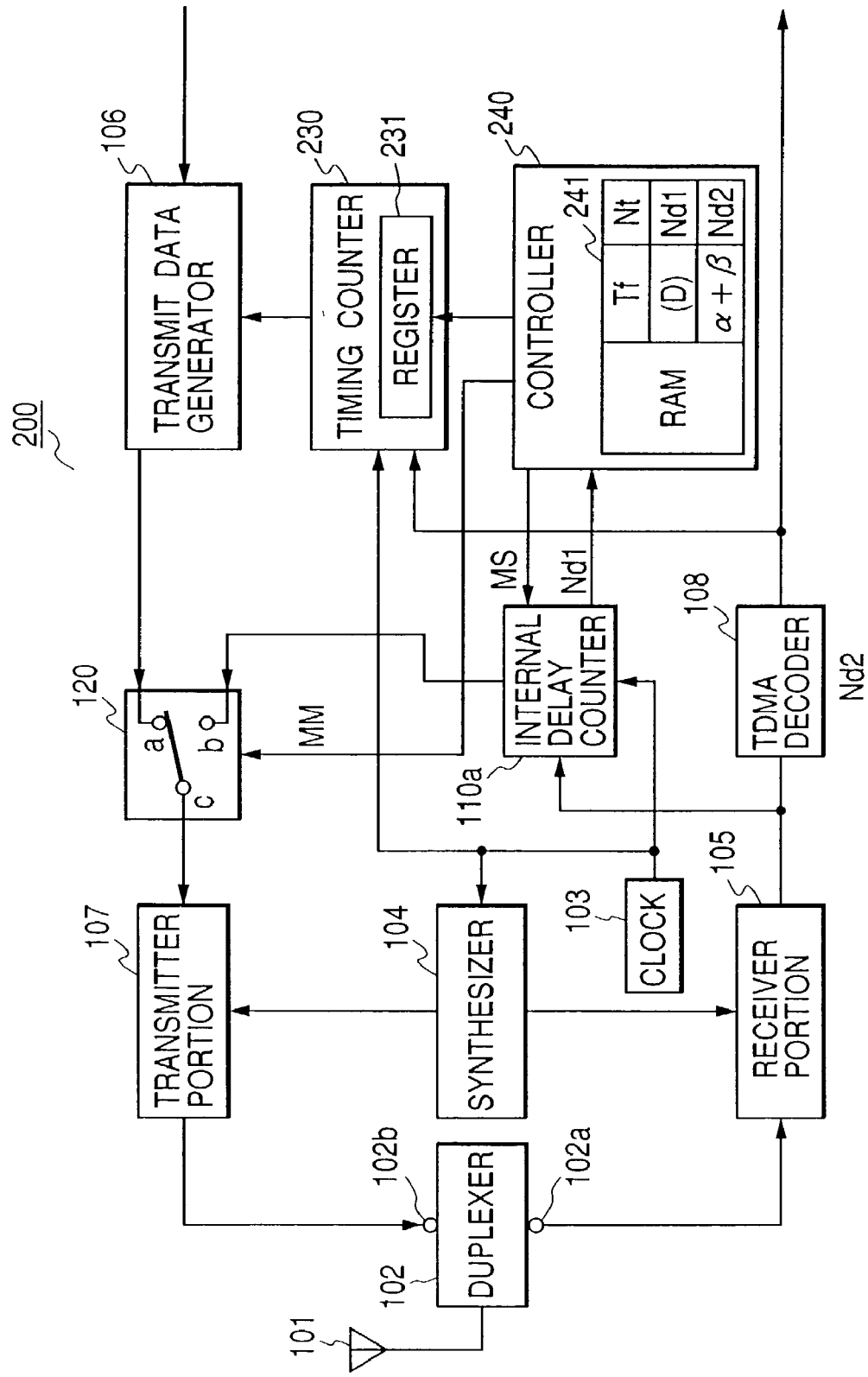
FIG. 10 is a schematic block diagram showing an arrangement of a part of a radio terminal with a transmit timing fine adjusting capability in accordance with a second illustrative embodiment of the invention.

FIG. 10 is a schematic block diagram showing an arrangement of a part of a radio terminal with a transmit timing fine adjusting capability in accordance with a second illustrative embodiment of the invention. The radio terminal 200 of FIG. 10 is identical to that of FIG. 2 except that the time slot timing controller 130 and the Nd register setter 135 has been replaced with a combination of a timing counter 230 and a controller 240 and a TDMA decoder 108 is inserted after the receiver portion 105. Also, the internal delay counter circuit 110 has been replaced with 110a.

The TDMA decoder 108 extracts data in a time slot in the demodulated signal from the receiver portion 105 which slot is assigned to the radio terminal 200.

The timing counter 230 has a register 231 for storing a preset number. The counter 230 is started by the TDMA decoder 108 output and puts out the above-described trigger signal to the transmit data generator 106 when it counts up to the preset number.

The controller 140 is not dedicated to the control of transmit timing adjustment but also used for the control of the whole terminal. The controller 140 preferably comprises a not-shown CPU (central processing unit), a not-shown ROM (read only memory), and RAM (random access memory) 241. The, RAM stores above-described data Tf, D, $\alpha$+$\beta$, Nt, Nd and Nt–Nd.

However, it should be noted that the output signal from the TDMA decoder 108 is used as the trigger signal to the timing counter 230. Therefore, the pulse count corresponding to the total internal delay time, Nd, equals Nd1+Nd2, where Nd1 is a pulse count of the counter 114, and Nd2 is a pulse count corresponding to the delay time due to the TDMA decoder 108. For this reason, the delay times Nd1 and Nd2 are actually stored in the RAM 241 instead of Nd. The controller 240 controls the internal delay counter 110 and the selector 120 to measure the internal delay time count Nd1. The controller 240 reads the count value Nd1 from the counter 114 and sets the transmit timing count (Nt–Nd1–Nd2) which corresponds to the transmission wait time T to the register 231 of the timing counter 230 as the preset number.

It is also noted that the transmit timing has to be corrected also with the propagation delay time D as (Tf–D) because the propagation delay time D due to the transmission path is not negligible in case of a satellite communication system. However, if the value of the propagation delay time D is sufficiently small as compared with the total internal delay time as is the case with a terrestrial communication system, there is no need of a correction with the propagation delay time D; accordingly the RAM 240 need not store the value D; and the pulse count Nt may be equal to Tf×Tc instead of (Tf–D)×Tc (Tc is a period of the clock signal from the clock 103).

Figure 11:
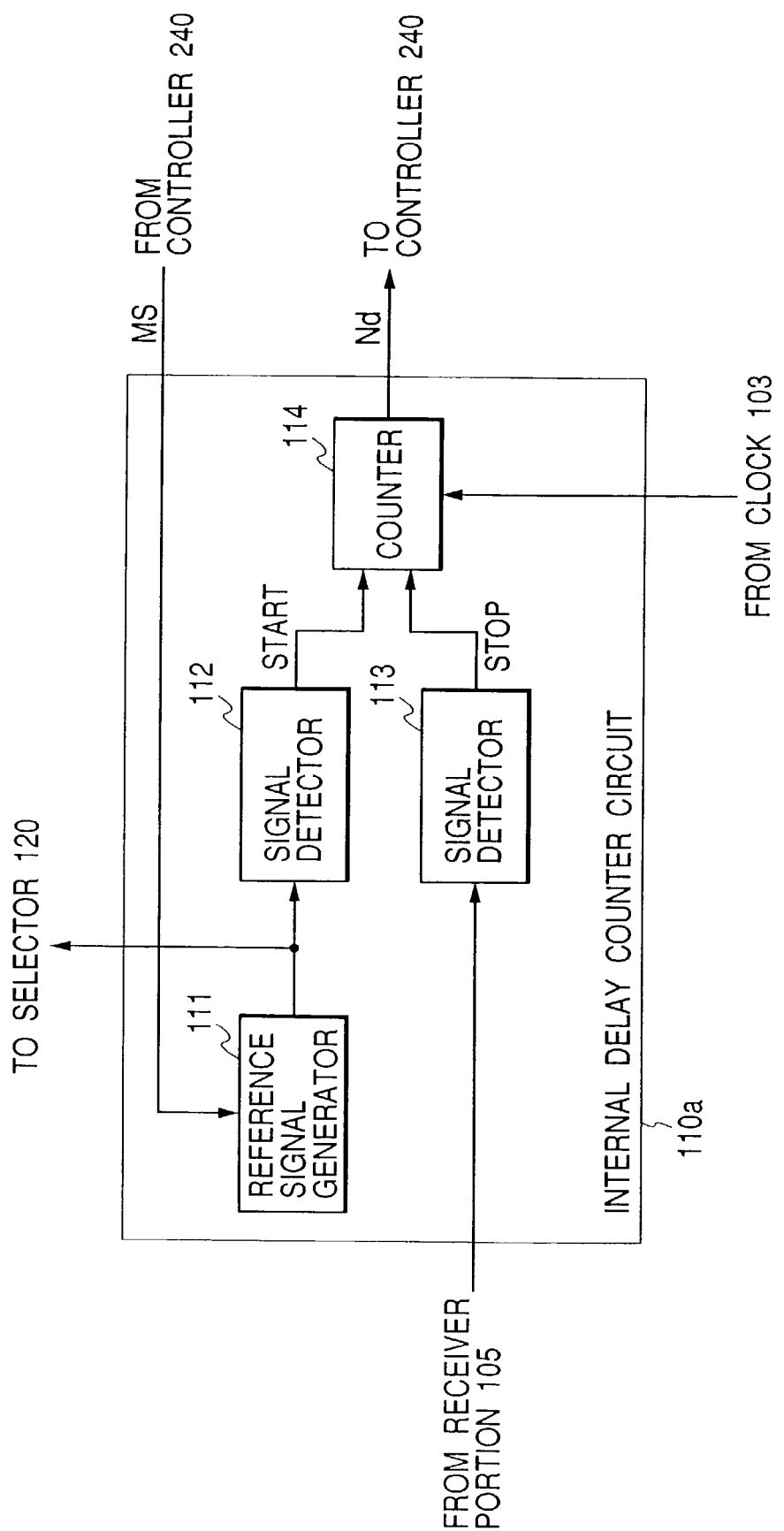
FIG. 11 is a schematic diagram showing an exemplary arrangement of the internal delay counter circuit 110a of FIG. 10.

In the internal delay counter circuit 110a of FIG. 11, the stop signal is supplied only to the counter 114. The reference signal generator 111 is started by the measurement start (MS) signal from the controller 240.

The selector 120 is controlled by the measurement mode (MM) signal from the controller 240 instead the Pon signal.

As seen from the above description, the measurement of the delay time is controlled by the signals from the controller 240 instead of the Pon signal generated in response to a power on. For this reason, the measurement may be made not only at a power-on time but also at any desired time according to a program stored in the not-shown ROM.

Figure 12:
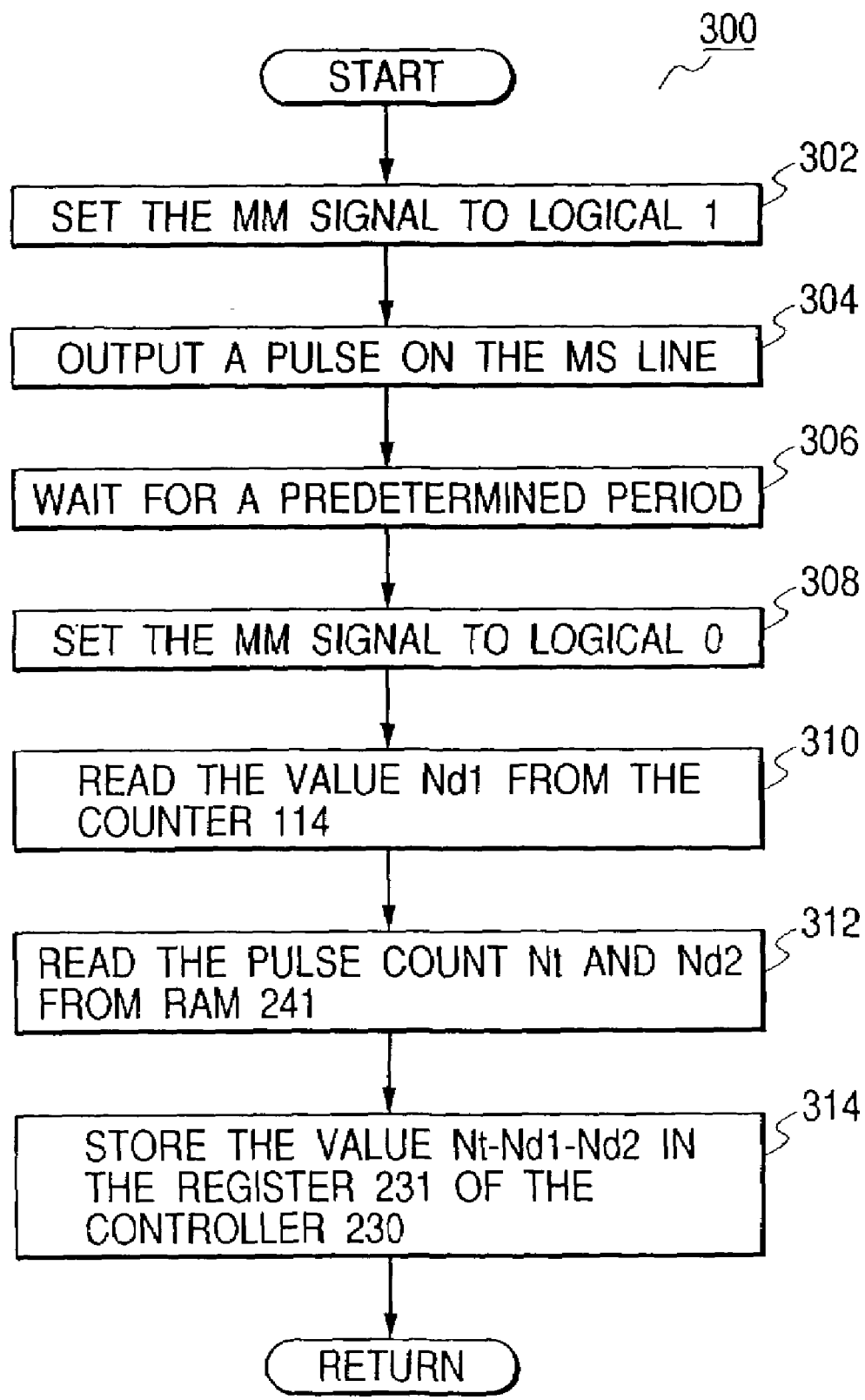
FIG. 12 is a flowchart showing an operation executed by the not-shown CPU of the controller 240 under the control of a transmission wait time count setting subroutine.

FIG. 12 is a flowchart showing an operation executed by the not-shown CPU of the controller 240 under the control of a transmission wait time count setting subroutine 300. If the program calls the subroutine 300, then the CPU (not shown) first sets the MM signal to logical 1 to connect the common terminal 120c with the terminal 120b in the switch 120 in step 302. In step 304, the CPU outputs a pulse on the MS line to activate the reference signal generator 111.

This causes the generator 111 to generate a reference signal, which thereafter travels through the switch terminals 120b and c, the transmitter portion 107, the receiver portion 105 to become a demodulated signal as described in connection with the first embodiment. The demodulated signal causes the counter 114 to stop and hold a pulse count Nd1 corresponding to the internal delay time due to the transmitter portion 107 and the receiver portion 105. In order to ensure the completion of this process, the CPU waits for a predetermined period of time not shorter than the possible maximum total internal delay time in step 306.

In step 308, the CPU sets the MM signal to logical 0 to connect the common terminal 120c with the terminal 120a for normal communication operation. In step 310, the CPU reads the value Nd1 of the counter 114. In step 312, the CPU reads the pulse count Nt and Nd2 from the RAM 241 and stores Nt−Nd1−Nd2 in the register 231 of the timing counter 230. Then the CPU returns to the program.

Figure 13:
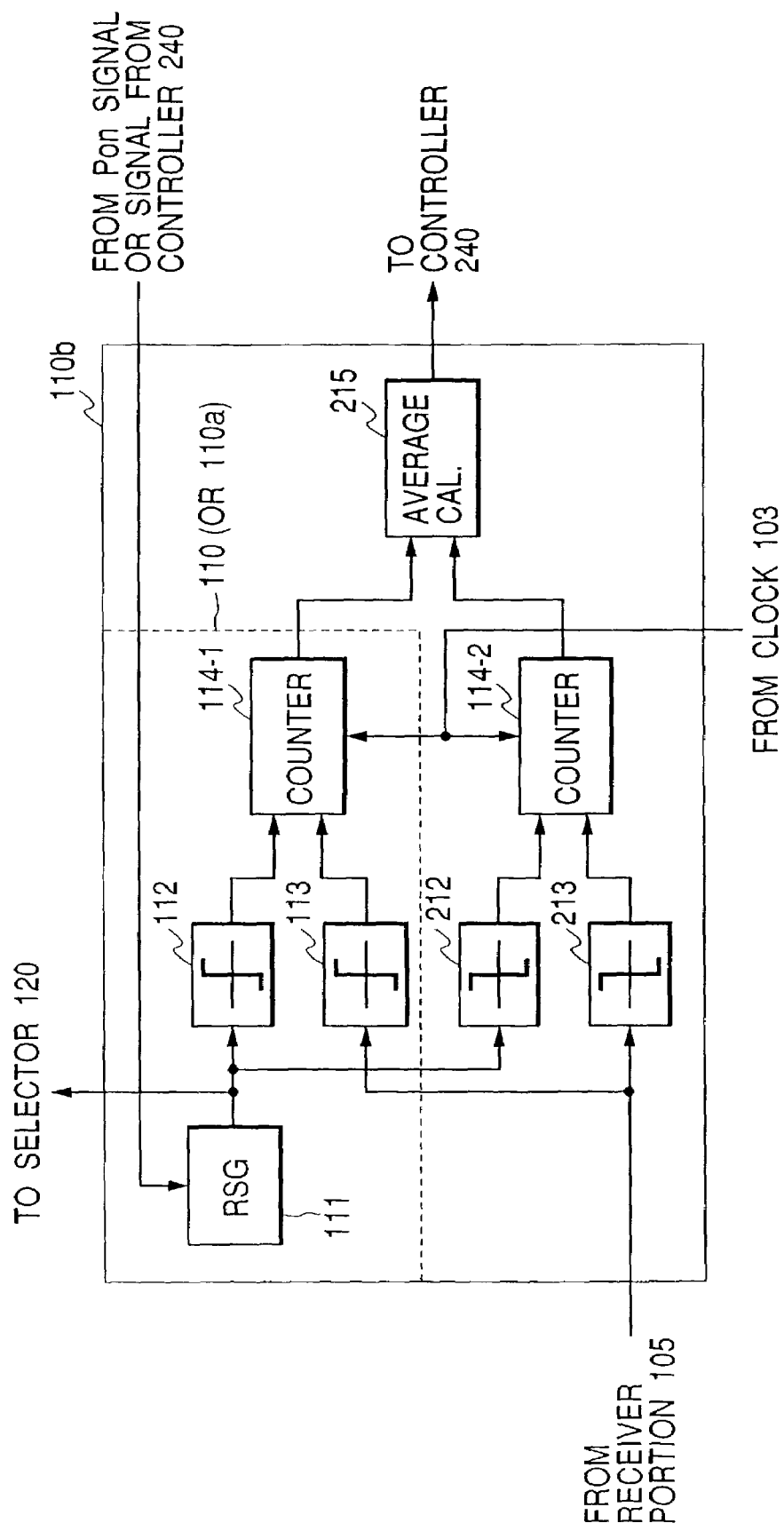

FIG. 13 is a block diagram showing an arrangement of another embodiment of an internal delay counter circuit which is usable in place of the internal delay counter circuit 110 or 110a. In FIG. 13, it is assumed that a reference signal generated by the reference signal generator (RSG) 111 is a pulse of a predetermined duration as shown in FIG. 7. Assuming that the signal detectors 112 and 113 are, for example, comparators of, say, a rising edge-sensitive type, then signal detectors 212 and 213 are, for example, comparators of a falling edge-sensitive type. The threshold value of the signal detectors 112 and 212 to which the reference signal is supplied is set to, say, a half of the amplitude of the reference signal. Similarly, the threshold value of the signal detectors 113 and 213 to which the demodulated signal from the receiver portion 105 is supplied is set to, say, a half of the amplitude of the demodulated signal.

As seen from the just above paragraph and FIG. 13, a first part comprising the elements 111 through 113 and a counter 114-1 constitute an internal delay counter circuit like 110 or 110a. The first part measures the time difference between the rising edges of the reference signal and the returned modulated signal, Td1, as shown in FIG. 7.

Similarly, a second part comprising the reference signal generator 111, the falling edge-sensitive signal detectors 212 and 213, and a counter through 113 and a counter 114-2 constitute another internal delay counter circuit like 110 or 110a. The second part measures the time difference between the falling edges of the reference signal and the returned modulated signal, Td2.

The value of the counter 114-1, Nd1, and the value of the counter 114-2, Nd2, are supplied to the two input terminals of an average calculator (CAL.) 215, where Nd1=Td1/Tc and Nd2=Td2/Tc (Tc is a period of the clock signal). The average calculator 215 calculates an arithmetic average of the total internal delay time counts Nd1 and Nd2 measured by the rising edges and the falling edges, respectively. That is, the calculator 215 finds (Nd1+Nd2)/2 as the total internal delay time Nd.

Thus, the internal delay counter circuit 110b enables the measurement of the total internal delay time without errors due to changes in the threshold values.

Modification

Figure 14:
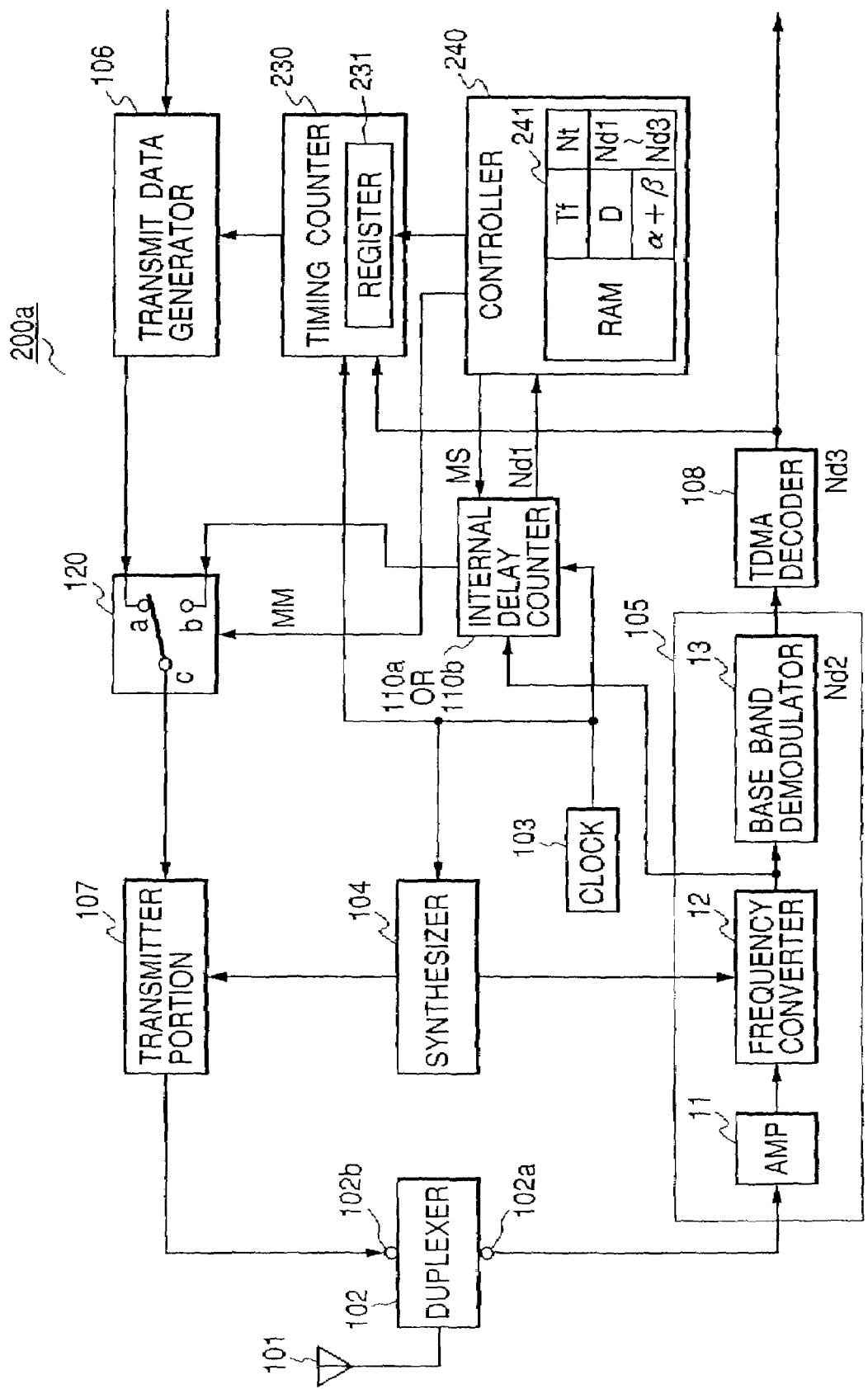
FIG. 14 is a schematic block diagram showing an arrangement of a part of a radio terminal with a transmit timing fine adjusting capability in accordance with a modification of the second illustrative embodiment of the invention.

In the first and second illustrative embodiments, the output signal from the receiver portion 105 has been used as the input signal to the signal detector 113 of the internal delay counter circuit 110a. However, the output signal from the frequency converter 12 may be used as the input signal to the signal detector 113 as shown in FIG. 14 for example.

In this case, the base band demodulator 13 is preferably a digital demodulator because the delay times which occurs in digital demodulators hardly vary and accordingly are easy to estimate before hand. Assuming that the pulse count of the counter 114 or the average calculator 215 is Nd1 and the delay times due to the base band demodulator 13 and the TDMA decoder 108 are Nd2 and Nd3, respectively, then the controller 240 stores Nt−Nd1−Nd2−Nd3 in the register 231 of the timing counter 230.

Embodiment III

Figure 15:
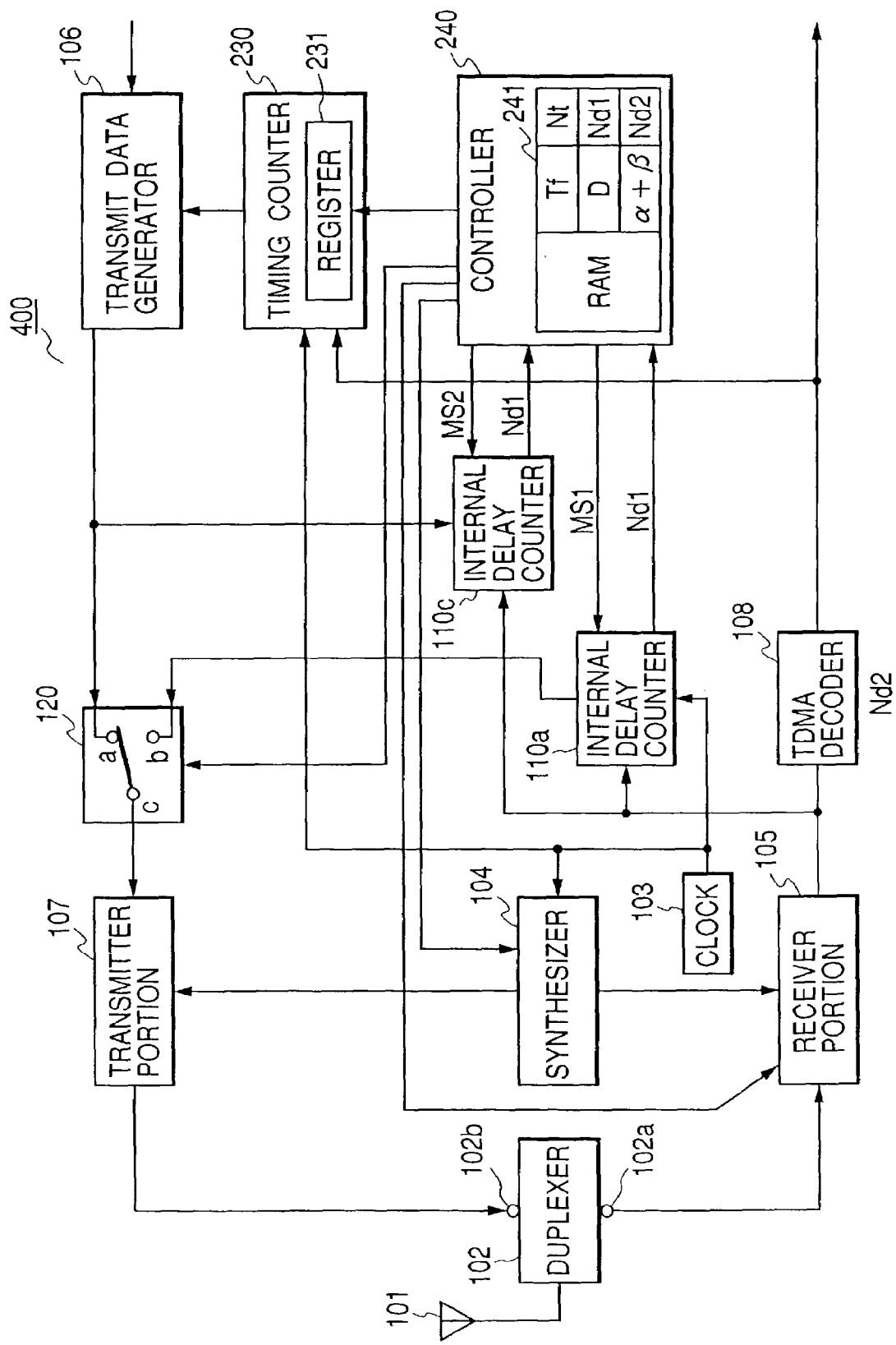
FIG. 15 is a schematic block diagram showing an arrangement of a part of a radio terminal with a transmit timing fine adjusting capability in accordance with a third illustrative embodiment of the invention.

FIG. 15 is a schematic block diagram showing an arrangement of a part of a radio terminal 400 with a transmit timing fine adjusting capability in accordance with a third illustrative embodiment of the invention. The radio terminal 400 of FIG. 15 is identical to that of FIG. 10 except that an internal delay counter 110c has been added in FIG. 400. It is assumed that the radio terminal 400 does not perform the up link transmission and the down link reception at the same time, i.e., the radio terminal is not full duplex.

Figure 16:
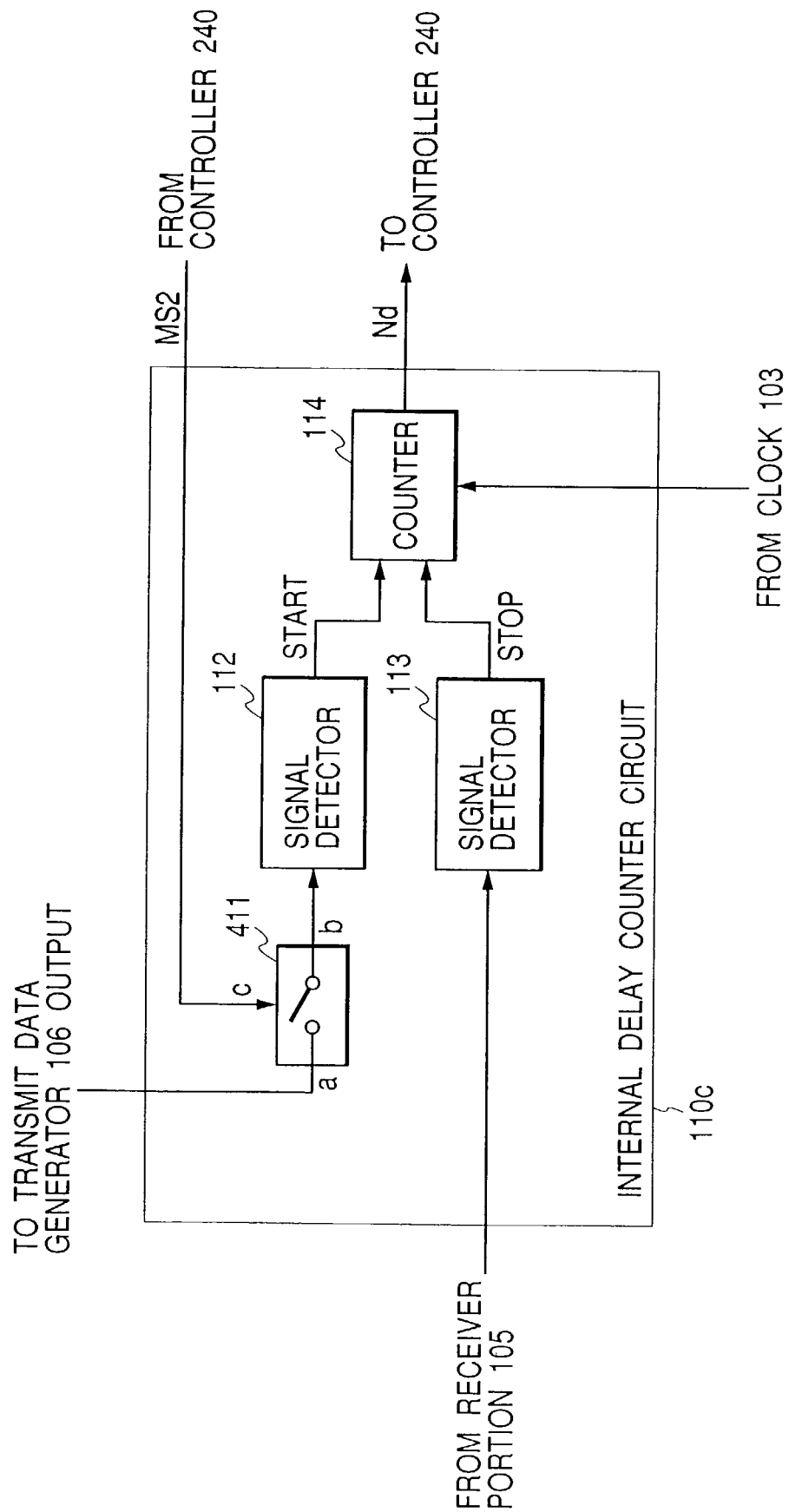
FIG. 16 is a block diagram showing an arrangement of an illustrative embodiment of an internal delay counter circuit which uses the transmit data generator 106 output as a reference signal.

FIG. 16 is a block diagram showing an arrangement of an illustrative embodiment of an internal delay counter circuit 110c which uses the transmit data generator 106 output as a reference signal. The internal delay counter circuit 110c of FIG. 16 is identical to that of FIG. 11 except that the reference signal generator 111 has been replaced with an on/off switch 411. A switch signal input 411a is connected with the transmit data generator 106 output. A switch signal output 411b is connected with the signal detector 112. A switch control terminal 411c is connected with an MS2 line from the controller 240. The switch 411 is so arranged as to pass the input pulses only when the MS2 signal from the controller is logical 1.

In response to a turning on of the radio terminal 400, the controller 240 makes a measurement of the internal delay time by using the internal delay counter circuit 110a. Since the operation of the measurement is identical to that of FIG. 10, the description of the measuring operation is omitted. (Though the MS signal has been renamed MS1.)

Thereafter, the controller 240 regularly makes a measurement of the internal delay time by using the internal delay counter circuit 110c. In this measurement, the counter 114 is started by a series of data which is supplied from the generator 106 while the MS2 signal from the controller 240 is logical 1. The series of data also travels through the selector 120 and the transmitted portion 107 to reach the duplexer 102, where an attenuated transmission band signal is captured by a reception system. Since the control signals which are supplied from the controller 240 to the synthesizer 104 and the receiver portion 105 has caused the receiver portion 105 to select a channel identical to the transmission band by then, the captured signal is selected and demodulated into a demodulated signal, which causes the counter 114 to stop. Thereafter, the pulse count Nt−Nd1−Nd2 is set to the register 231 of the timing controller 230. Thus the register 231 value is updated.

According to the embodiment of the invention, the transmission wait time is regularly updated, which eliminates the influence of changes in the ambient temperature. The regular measurement of the internal relay time by the internal delay counter circuit 110c is performed by using up link transmissions, which prevents undesirable radio waves from radiating.

Embodiment IV

Figure 17:
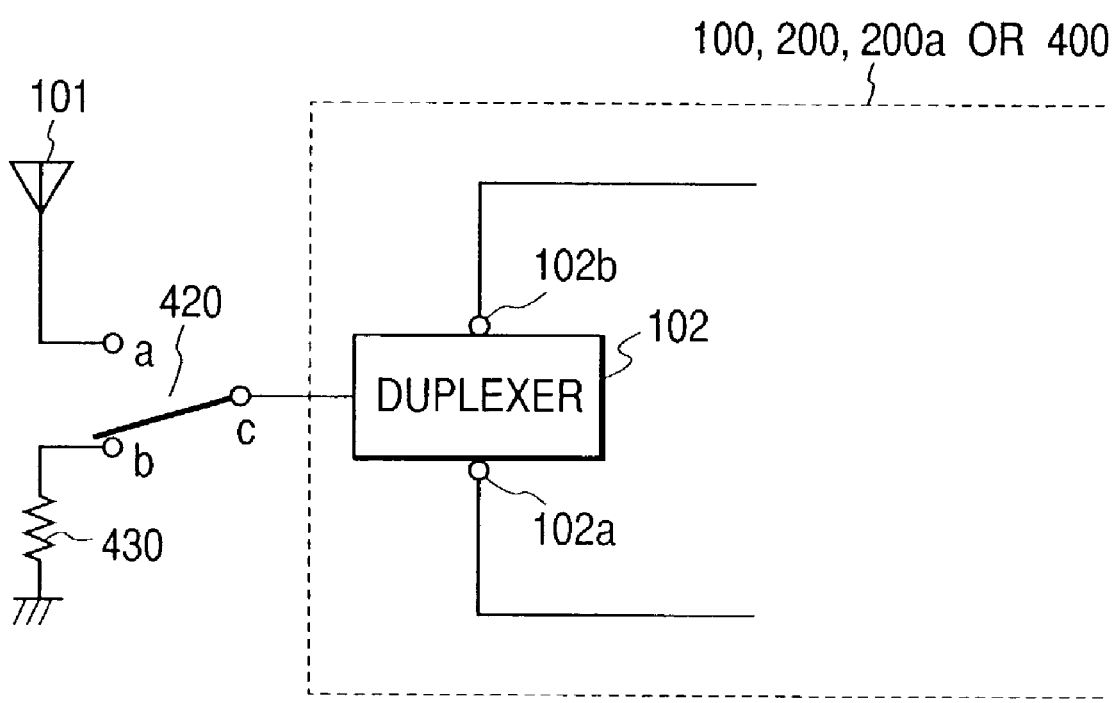
FIG. 17 is a diagram showing an exemplary arrangement of a system 500 for measuring the total internal delay time of a radio terminal at the production site in accordance with principles of the invention.

FIG. 17 is a diagram showing an exemplary arrangement of a system for measuring the total internal delay time of a radio terminal at the production site in accordance with principles of the invention. The radio terminal may be any of the above described ones 100, 200, 200a and 400. The measurement is performed before the antenna 101 is attached to the main body of the radio terminal. The antenna-side terminal of the duplexer 102 is connected to the common terminal of a 1-of-2 switch 420, 420c. The switch terminal 420a is connected with an antenna 101, and the switch terminal 420b is connected with an impedance matching element 430 which is impedance matched to the antenna 101. When the measurement is performed, the switch common terminal 420c is connected with the terminal 420b, i.e., the impedance matching element 430. The operation of the measurement is identical to a case of the measurement on a radio terminal alone. The resultant pulse count Nd is stored in the register 132 in case of a radio terminal 100. Similarly, the resultant value Nt−Nd is stored in the register 231 of the timing counter 230 in case of any of radio terminals 200, 200a and 400.

According to the embodiment, the measurement of the internal relay time can be performed without radiating undesirable radio waves.

Figure 18:
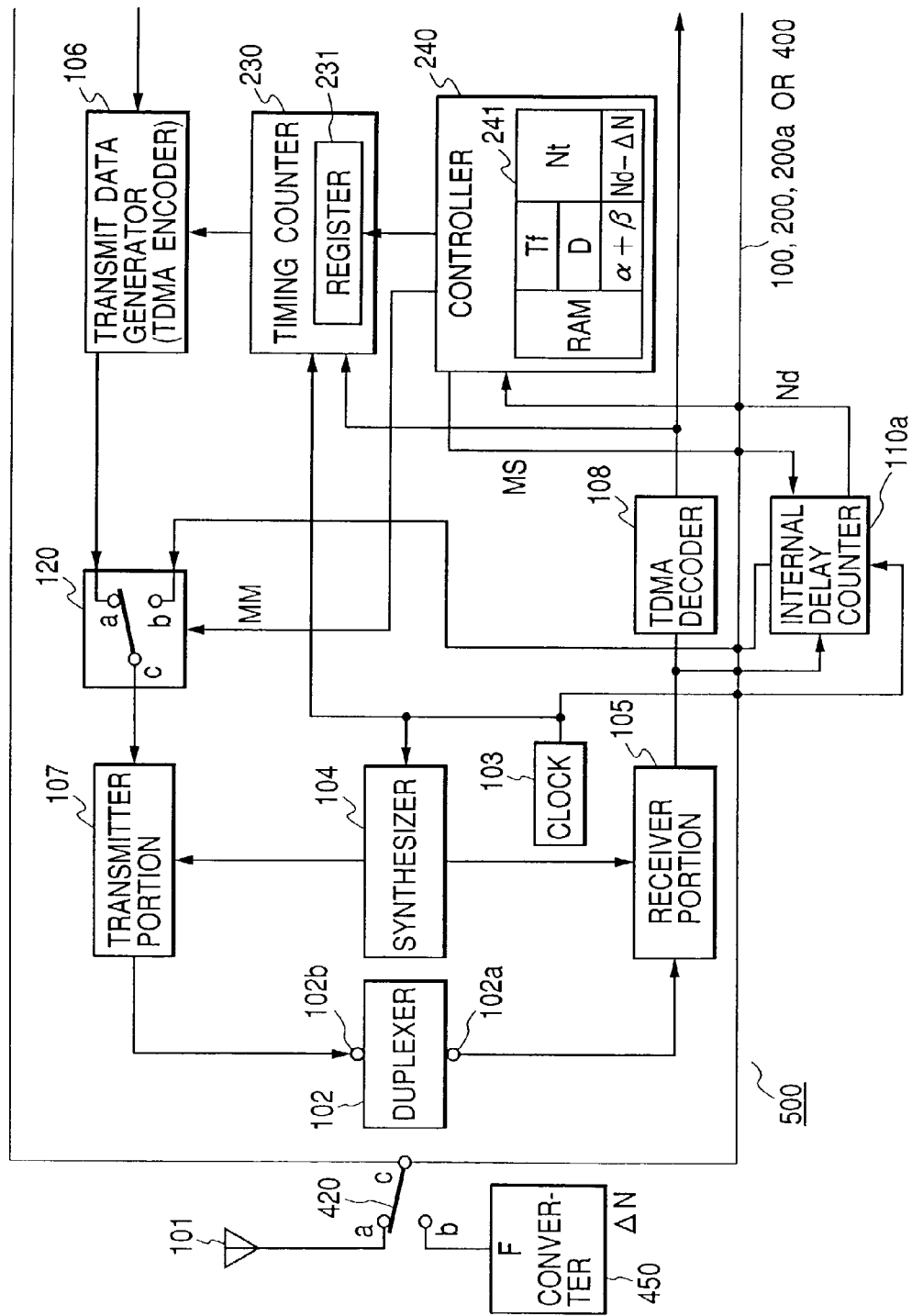
FIG. 18 is a diagram showing an exemplary arrangement of another system 500 for measuring the total internal delay time of a radio terminal at the production site in accordance with principles of the invention.

FIG. 18 shows an exemplary arrangement of another system 500 for measuring the total internal delay time of a radio terminal at the production site in accordance with the principles of the invention. The system 500 comprises one of above-described radio terminals 100, 200, 200a and 400 which has not had its antenna 101 attached thereto, a 1-of-2 switch 420, an antenna 101 and a frequency converter 450. The switch common terminal 420c is detachably and electrically connected with the antenna-side terminal of the duplexer 102.

It is noted that the internal delay counter circuit 110a is not incorporated in the radio terminal but is detachably and electrically connected with the radio terminal, in which the internal delay counter circuit 110a is electrically connected in the same manner as in case where it is incorporated in the radio terminal. The frequency converter 450 is for converting the transmission band signal output from the duplexer 102 into a predetermined channel within a reception band and attenuating the frequency-converted transmission band signal by a predetermined amplitude and feeding the duplexer 102 with the attenuated transmission band signal. The predetermined attenuation amplitude is such that the attenuated transmission band signal is not distorted by the amplifier (AMP) 11 of the receiver portion 105 saturating and has a sufficient level to be demodulated in the receiver portion 105.

In measuring the total internal delay time, the transmitted reference signal is frequency converted and attenuated by the frequency converter to return through the receiver portion 105. The other operation is the same as that of the above-describe embodiments.

According to the system, the measurement of the internal relay time can be performed without radiating undesirable radio waves. Also, a radio terminal has no need of having the internal delay counter circuit 110a inside.

There may be a case where the delay (Dfc) due to the frequency converter 450 is not negligible. In such a case, a pulse count ΔN corresponding to the delay Dfc is subtracted from the pulse count of the counter Nd (Dfc=Tc×ΔN). In case of a radio terminal 100, the pulse count (Nd−ΔN) is stored in the register 132. In case of the other embodiments, the transmission wait time Nt−(Nd−ΔN) is stored in the register 231.

It is also noted that the frequency converter 450 has not necessarily to be used. Instead, the measurement may be done in the same way as in case of the first embodiment.

Though it is assumed that the radio terminal is used in a TDMA communication system, the inventive technique of measuring the internal delay time in a radio station can be applied to any suitable communication system such as a CDMA (code-division multiple access) communication. If a radio terminal transmits the measured internal delay time to a base station serving the radio terminal, then, on the basis of the received measured internal delay time, the base station can either control the transmission timing of down link to the radio terminal or direct the radio terminal to change the up-link transmission timing.

In a CDMA communication system, clock pulses are counted after a detection of a time slot assigned to a down link communication.

Many widely different embodiments of the present invention may be constructed without departing from the spirit and scope of the present invention. It should be understood that the present invention is not limited to the specific embodiments described in the specification, except as defined in the appended claims.

What is claimed is:

1. A radio terminal capable of measuring internal delay time in a communication system based on an access method using spreading codes, the radio terminal comprising:
   an antenna;
   means coupled with said antenna and having an input terminal and an output terminal for using said antenna both for transmission and reception, respectively;
   means for converting a transmission signal into a transmission band signal to feed said input terminal;
   means for converting a reception band signal from said output terminal into a demodulated signal;
   means for generating a reference pulse signal;
   means, activated at the latest at the same time as said generating a reference pulse signal, for coupling said reference signal instead of said transmission signal with said means for converting a transmission signal;
   means for causing said means for converting a reception band signal to select a channel identical to said transmission band; and
   means for counting clock pulses of a clock signal for a time period from said generating a reference pulse signal to said reference signal returning as said demodulated signal to provide a number of counted clock pulses, Nd, corresponding to said time period, wherein said time period is said internal delay time.

2. A radio terminal as defined in claim 1, further comprising means for providing a transmit timing signal alter counting Nt−Nd clock pulses after a detection of a relevant time slot from said demodulated signal, where Nt is a pulse count corresponding to a transmit timing at said antenna, whereby the radio terminal adjusts said transmit timing by using said measured internal delay time.

3. A radio terminal as defined in claim 1, further comprising means for transmitting said measured internal delay time to a base station serving the radio terminal.

4. A radio terminal as defined in claim 3, wherein the access method using spreading codes is a method of a code-division multiple access.

5. A radio terminal as defined in claim 1, wherein the access method using spreading codes is a method of a code-division multiple access.

* * * * *

UNITED STATES PATENT AND TRADEMARK OFFICE
CERTIFICATE OF CORRECTION

PATENT NO. : 6,999,440 B2  Page 1 of 1
APPLICATION NO. : 10/267990
DATED : February 14, 2006
INVENTOR(S) : Katsuaki Abe et al.

It is certified that error appears in the above-identified patent and that said Letters Patent is hereby corrected as shown below:

Col. 12, line 42, "alter" should read --after--.

Signed and Sealed this

Seventeenth Day of October, 2006

JON W. DUDAS
*Director of the United States Patent and Trademark Office*